United States Patent
Rieu et al.

(10) Patent No.: US 11,052,430 B2
(45) Date of Patent: Jul. 6, 2021

(54) PARCEL OR PACKET SORTING INSTALLATION COMPRISING A BIN SORTING CONVEYOR

(71) Applicant: SOLYSTIC, Bagneux (FR)

(72) Inventors: Jean Rieu, Saint Georges les Bain (FR); Damien Berliet, Bourg les Valence (FR); Wilfrid Beaugrand, Valence (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 16/983,526

(22) Filed: Aug. 3, 2020

(65) Prior Publication Data

US 2021/0094074 A1   Apr. 1, 2021

(30) Foreign Application Priority Data

Sep. 30, 2019   (FR) ...................................... 1910823

(51) Int. Cl.
| | | |
|---|---|---|
| *B07C 3/08* | (2006.01) | |
| *B07C 3/00* | (2006.01) | |
| *B65G 19/02* | (2006.01) | |
| *B65G 21/22* | (2006.01) | |
| *B65G 47/06* | (2006.01) | |

(Continued)

(52) U.S. Cl.
CPC ................ *B07C 3/08* (2013.01); *B07C 3/008* (2013.01); *B65G 19/02* (2013.01); *B65G 21/22* (2013.01); *B65G 47/06* (2013.01); *B65G 47/38* (2013.01); *B65G 47/44* (2013.01); *B65G 47/48* (2013.01); *B65G 2203/0216* (2013.01)

(58) Field of Classification Search
CPC ...... B65G 47/967; B65G 47/40; B65G 47/48; B65G 47/44; B65G 47/38; B65G 47/06; B65G 21/22; B65G 19/02; B07C 3/08; B07C 3/008
USPC ..................................................... 198/370.05
See application file for complete search history.

(56) References Cited

U.S. PATENT DOCUMENTS 1,428,721 A * 9/1922 Towne ................. B65G 47/967
198/477.1
5,850,901 A * 12/1998 Schuster ................. B07C 3/082
198/370.05

(Continued)

FOREIGN PATENT DOCUMENTS

| DE | 3530624 A1 | 12/1986 |
|---|---|---|
| EP | 2769776 A1 | 8/2014 |
| WO | 01/51223 A2 | 7/2001 |

OTHER PUBLICATIONS

French Search Report dated May 18, 2020 issued by INPI from corresponding Application No. FR 1910823, 1 page.

*Primary Examiner* — James R Bidwell
(74) *Attorney, Agent, or Firm* — Ware, Fressola, Maguire & Barber LLP (57) ABSTRACT

A parcel or packet sorting installation comprising a bin conveyor having bins (4) that are designed to convey the parcels in series in a certain conveying direction over a plurality of sorting outlets, and a parcel injector designed to inject one parcel per bin, said sorting conveyor being designed to sort the parcels into the sorting outlets from the bins as a function of sorting information affixed to each of the parcels. Each bin comprises two side walls (9) and a floor (10) mounted to pivot between the two side walls, and a flap (11) mounted to pivot at an upstream end of the floor relative to the conveying direction.

11 Claims, 7 Drawing Sheets

(51) Int. Cl.
  *B65G 47/38* (2006.01)
  *B65G 47/44* (2006.01)
  *B65G 47/48* (2006.01)

(56) References Cited

U.S. PATENT DOCUMENTS

| | | | | |
|---|---|---|---|---|
| 6,208,908 B1* | 3/2001 | Boyd | ................... | G06Q 10/087 |
| | | | | 700/216 |
| 7,128,202 B2* | 10/2006 | Balk | ...................... | B65G 17/14 |
| | | | | 198/704 |
| 2014/0360926 A1* | 12/2014 | Stone | ...................... | B07C 3/087 |
| | | | | 209/584 |

* cited by examiner

PARCEL OR PACKET SORTING INSTALLATION COMPRISING A BIN SORTING CONVEYOR

CROSS REFERENCE TO RELATED APPLICATIONS

This application claims priority under 35 USC § 119 to French Patent Application No. 1910823 filed on Sep. 30, 2019, which is hereby incorporated by reference in its entirety.

TECHNICAL FIELD

The present invention relates to a parcel or packet sorting installation comprising a bin conveyor having bins that are designed to convey the parcels in series in a certain conveying direction over a plurality of sorting outlets, and a parcel injector designed to inject one parcel per bin, said sorting conveyor being designed to sort the parcels into the sorting outlets from the bins as a function of sorting information affixed to each of the parcels.

PRIOR ART

The increasing volume of traffic of what may be referred to as "small import packets" (or "petits paquets import" or "PPI" as they are known in France), of a variety of sizes, weights, and shapes, is amplifying the need to equip sorting centers with a single common sorting installation that is capable of sorting a very large number of types of parcel at a high throughput rate.

A sorting installation of such a type is described in Document EP 2 769 776 and comprises a bin sorting conveyor having bins, or "trays" as they are referred to in that document, and an injector suitable for causing the parcels to fall into the trays.

Each tray as loaded with a parcel is then conveyed in tilted manner in the conveying direction over the sorting outlets.

The rear wall of the tray is then retracted to allow the parcel to fall by gravity into the appropriate sorting outlet.

The paths over which the parcels fall for being removed into the sorting outlets can thus vary as a function of the dimensions of the parcel, of the extent to which the parcel adheres to the tray, and of the weight distribution specific to each parcel, making the parcels more or less unbalanced.

The sorting outlets are thus wide enough to allow all of the possible fall paths, thereby increasing the footprint of the sorting conveyor, i.e. the area it occupies on the floor, and therefore the cost of the sorting installation.

In addition, while the parcel is falling from the injector onto the sorting conveyor, there is a considerable risk that the parcel might fall outside the tray or not be properly oriented to enable it to be subsequently removed into the appropriate sorting outlet.

Furthermore, if the parcel is not removed into a sorting outlet, that sorting installation does not make it possible to recycle the parcel for another sorting pass.

Document WO-A-01/51223 also shows a parcel or packet sorting installation comprising a bin sorting conveyor.

SUMMARY OF THE INVENTION

An object of the invention is to remedy the above-mentioned problems.

To this end, the invention provides a parcel or packet sorting installation for sorting parcels or packets, the installation comprising a bin sorting conveyor having bins that are designed to convey the parcels in series in a certain conveying direction over a plurality of sorting outlets, and a parcel injector designed to inject one parcel per bin, said bin sorting conveyor being designed to sort the parcels into the sorting outlets from the bins as a function of sorting information affixed to each of the parcels, each bin comprising two side walls and a floor mounted to pivot between the two side walls, said floor being designed to pivot between a high position and a low position, said sorting installation being characterized in that, in the low position, the floor is tilted downwards in the direction opposite from the conveying direction, and, in the high position, the floor is raised to the horizontal to come flush with the injector conveyor and to come flush with the top ends of the side walls, and in that each bin further comprises a flap mounted to pivot at an upstream end of the floor relative to the conveying direction, said flap being designed to pivot between a blocking position, in which the flap is raised to retain a parcel on the floor while said parcel is moving in the conveying direction, and a lowered position, in which the flap is retracted to enable a parcel to be removed by gravity into a sorting outlet.

The sorting installation of the invention may further have the following features:

- in the lowered position, the flap extends the floor in its plane upstream relative to the conveying direction;
- each bin further comprises a removal ramp in the form of fork tines that extend the floor in its plane upstream relative to the conveying direction, the flap also being in the form of fork tines that are arranged to pass between the fork tines of the removal ramp while the flap is moving from the raised position to the retracted position;
- the flap is pivoted from the raised position to the lowered position by means of a spring;
- the sorting conveyor further comprises a shaped-profile raising rail that extends in the conveying direction, each bin further comprising a lever that is secured to the flap and that is designed to co-operate with the raising rail while the bin is moving in the conveying direction so that the flap pivots from the lowered position to the raised position as a function of the raising profile of the rail;
- each bin further comprises a latch suitable for holding the flap in the raised position, the sorting conveyor further comprising a mechanical actuator suitable for being actuated under the control of a monitoring and control unit in response to sorting information affixed to the parcel to be sorted into a sorting outlet so as to cause the latch to toggle and to allow the flap to pivot into the lowered position above said sorting outlet;
- the sorting conveyor further comprises a shaped-profile guide rail that extends in the conveying direction, said floor co-operating with the guide rail while the bin is moving in the conveying direction to pivot between the high position and the low position as a function of the guide profile of the rail;
- the floor has a corrugated surface;
- the tilt angle at which the floor tilts in the low position is defined as a function of the mean coefficient of friction of the parcels to be sorted;
- each bin further comprises a tilted downstream deflector that extends under the floor and between the two side walls, said deflector co-operating with the floor and with the side walls of the adjacent bin downstream in the conveying direction to form a parcel removal chute; and each bin further comprises a parcel injection guide comprising a plate flanked by two side deflectors converging towards the floor, said injection guide being disposed on one of the side walls so as to come flush with the injector and with the floor in the high position.

BRIEF DESCRIPTION OF THE DRAWINGS

The present invention can be better understood and other advantages appear on reading the following detailed description of embodiments given by way of non-limiting example and with reference to the accompanying drawings, in which.

DESCRIPTION OF THE EMBODIMENTS

Figure 1:
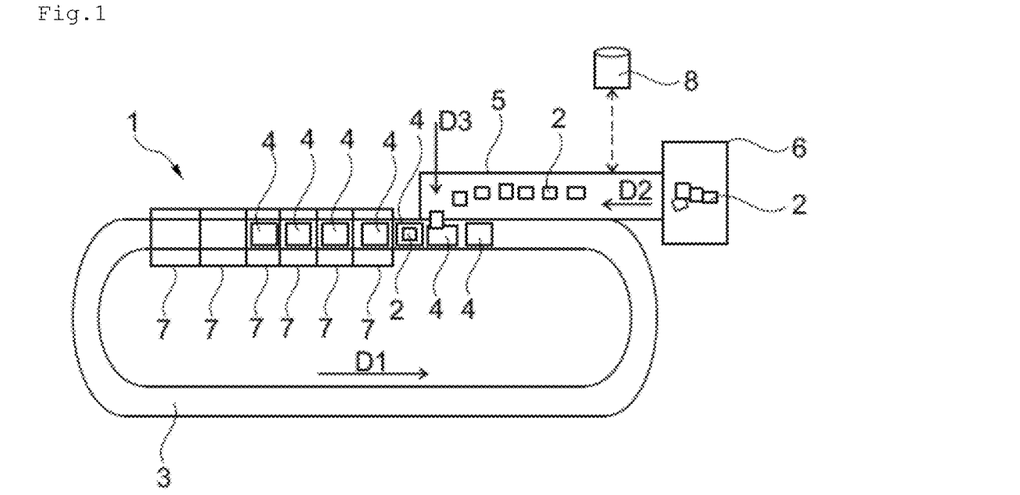
FIG. 1 is a highly diagrammatic view of a sorting installation of the invention.

The sorting installation 1 of the invention as shown in FIG. 1 is particularly well adapted for high-throughput sorting of parcels 2 or packets of various sizes and shapes that may be referred to as "small import packets".

The sorting installation 1 comprises, in particular, a sorting conveyor 3 having bins 4 that are assembled together one behind another at uniform pitch in the manner of a train of bins, a parcel injector 5 for injecting parcels 2, which injector is designed to inject the parcels 2 into the bins 4, and a parcel feed inlet 6 for feeding the injector 5 with parcels 2.

The bin sorting conveyor 3 having bins 4, which conveyor is a bin carousel in this example, extends around a closed loop in a certain conveying direction D1 and moves around the loop at a constant velocity.

Each bin 4 is suitable for receiving a parcel 2 and for conveying it to a sorting outlet 7 that is appropriate for removing it.

For this purpose, the sorting installation 1 is equipped with a monitoring and control unit 8 that, in a memory, contains a sorting plan for sorting the parcels 2 to be distributed to the various different sorting outlets 7.

The monitoring and control unit 8 is also designed to receive sorting information that is affixed to the parcels 2, and to respond by causing the parcels to be removed into the appropriate sorting outlets 7.

Figure 2:
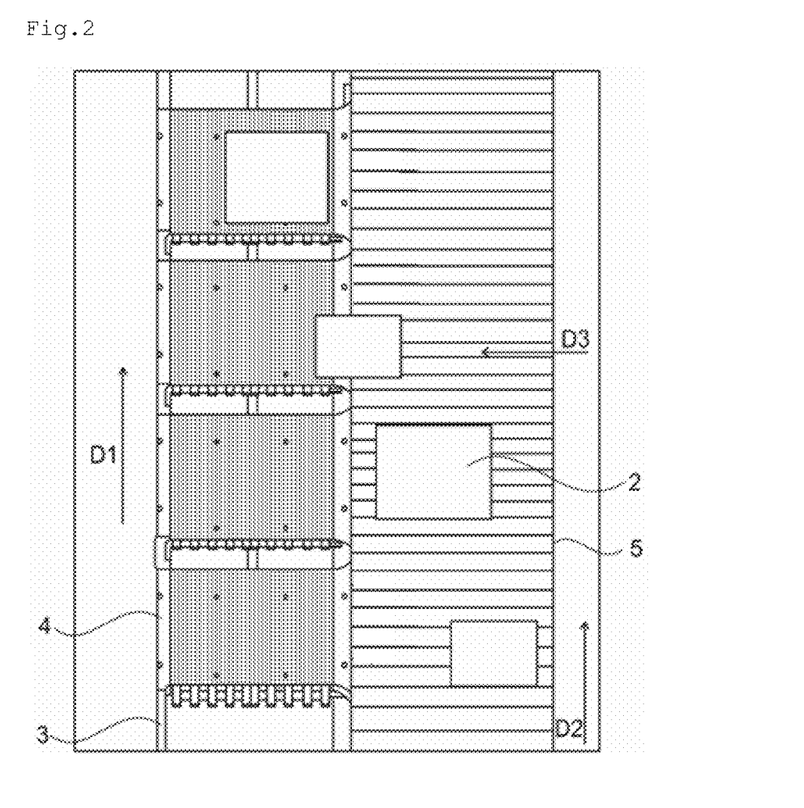
FIG. 2 is a view from above showing an injector for injecting parcels onto a sorting conveyor of the invention.
Figure 4:
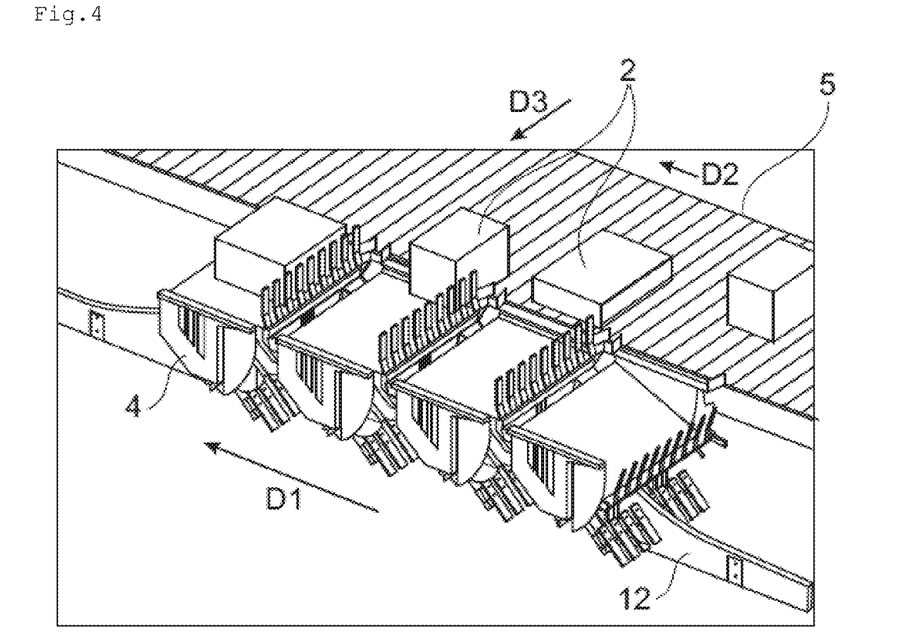
FIG. 4 is a perspective view of an injector for injecting parcels onto a sorting conveyor of the invention having bins that move in the conveying direction.

The injector 5 of the invention extends flush with the sorting conveyor 3, as shown in FIGS. 2 and 4, so as to convey the parcels 2 in a carrying direction D2 parallel to the conveying direction D1, at a velocity equivalent to the velocity of the sorting conveyor 3.

Thus, while the parcels 2 are moving in the carrying direction D2, the injector 5 is designed to shift the parcels 2 to one side in an injection direction D3 perpendicular to the carrying direction D2, and to enable them to be injected into the bins 4.

The bins 4 of the invention, shown in FIGS. 3a to 3d and 8, have multiple functions within the sorting installation 1 since they enable the parcels 2 as injected flat by the injector 5 to be received properly, they enable the parcels 2 to be conveyed safely in tilted manner in the conveying direction D1, and they enable the parcels 2 to be removed vertically into the appropriate sorting outlets 7.

Each bin 4 comprises, in particular, two side walls 9 and a floor 10 that is mounted to pivot between the two side walls 9.

The floor 10 may take up a high position in which it is raised to the horizontal so that it comes flush with the injector 5 and flush with the top ends of the side walls 9.

In this position, the injector 5 may inject the parcels 2 as flat onto the floors with the parcels being oriented in an orientation chosen to enable them to be removed properly into the sorting outlets 7.

Figure 3A:
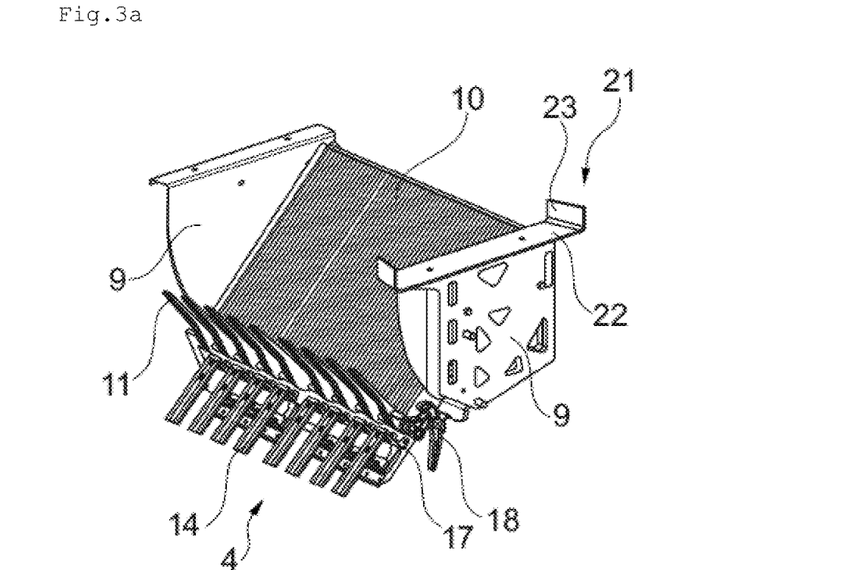
FIG. 3a shows a bin of the invention seen from a certain angle.

The floor 10 of the invention may also be pivoted into a low position, which can be seen in FIG. 3a, and in which the floor 10 tilts downwards in the direction opposite from the conveying direction D1.

Figure 3B:
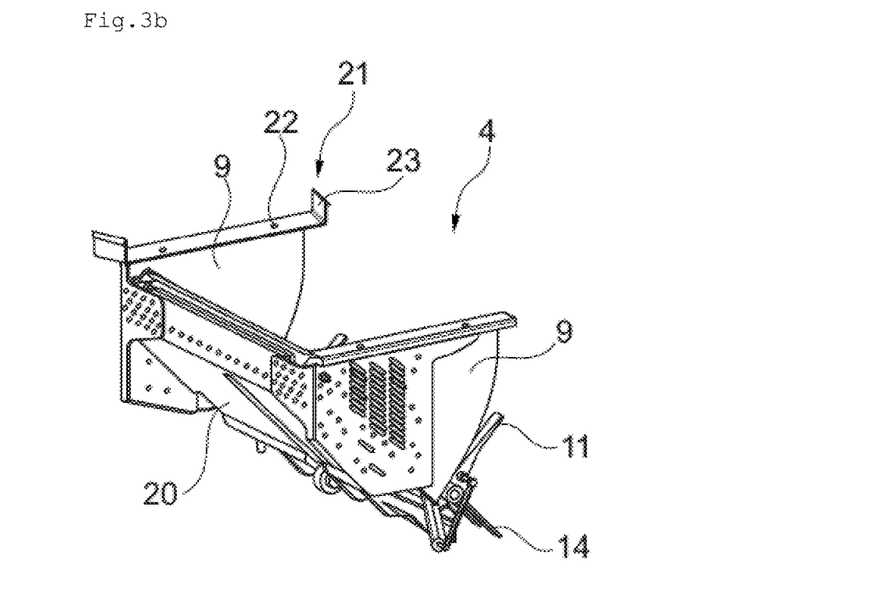
FIG. 3b shows a bin of the invention seen from a certain angle.
Figure 3C:
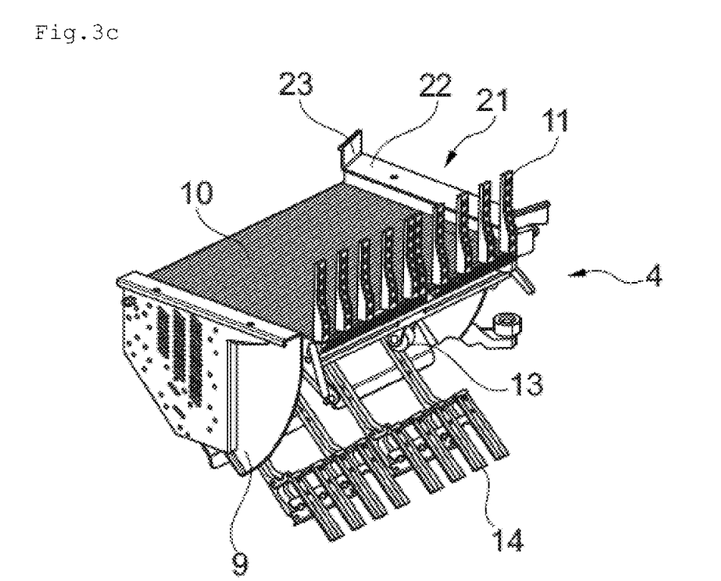
FIG. 3c shows a bin of the invention seen from a certain angle.

A flap 11 that is mounted to pivot on an upstream end of the floor 10 relative to the conveying direction D1, and that is shown in a raised position in FIGS. 3a to 3c, makes it possible to retain the parcels 2 loaded on the floor 10 as tilted.

Figure 6:
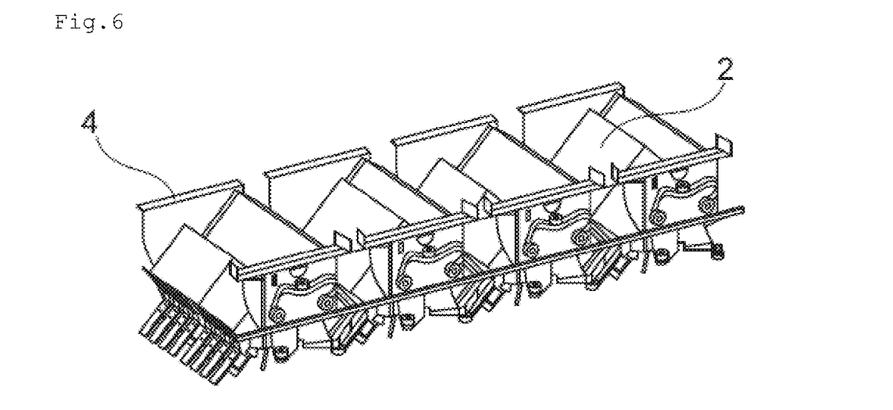
FIG. 6 shows several bins with their floors in the low position and the flap in the raised position for conveying the parcels in tilted manner.
Figure 7A:
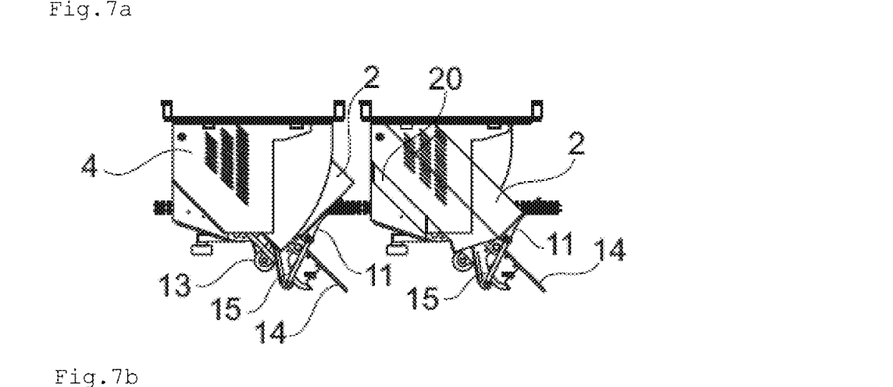
FIG. 7a shows a step of the opening process whereby the flap of a bin of the invention is caused to open from the raised position to the lowered position.
Figure 7B:
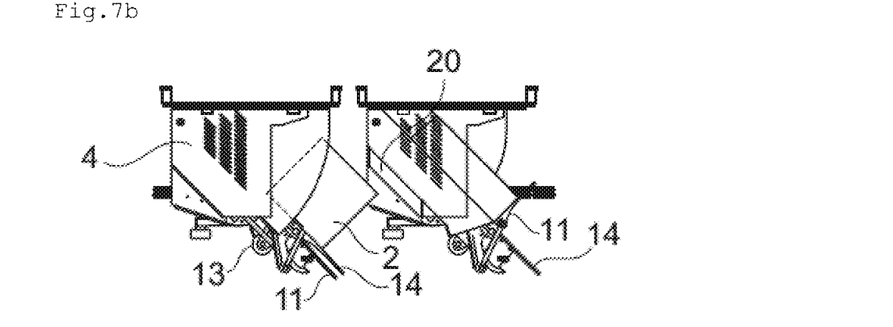
FIG. 7b shows a step of the opening process whereby the flap of a bin of the invention is caused to open from the raised position to the lowered position.
Figure 7C:
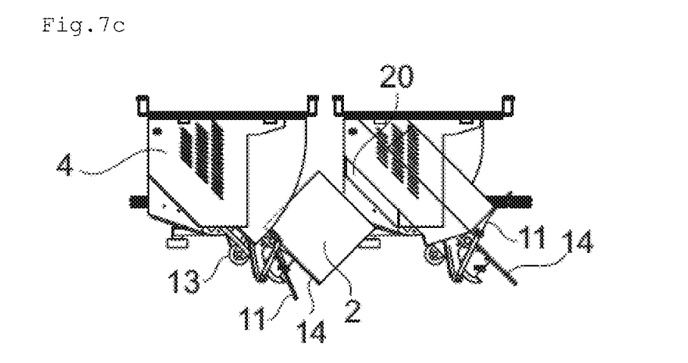
FIG. 7c shows a step of the opening process whereby the flap of a bin of the invention is caused to open from the raised position to the lowered position.
Figure 7D:
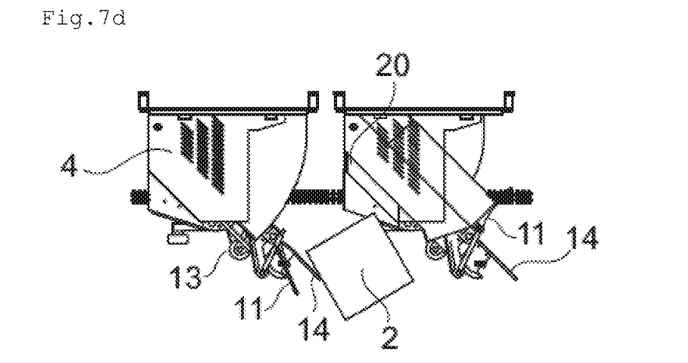
FIG. 7d shows a step of the opening process whereby the flap of a bin of the invention is caused to open from the raised position to the lowered position.
Figure 8:
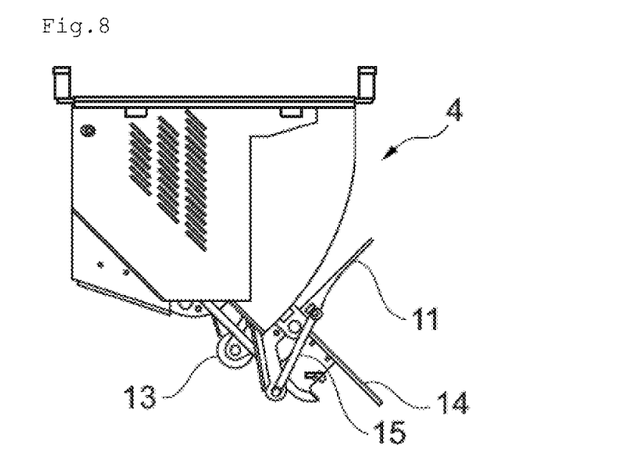
FIG. 8 is a side view of a bin of the invention.

The floor 10 as tilted, the side walls 9, and the flap 11 in the raised position, thus form a receptacle or container suitable for holding a parcel 2 in tilted manner while the bin 4 is moving in the conveying direction D1, as shown in FIG. 6, be it while the bin is moving along a straight line or going around the bends in the sorting conveyor 3.

Figure 5:
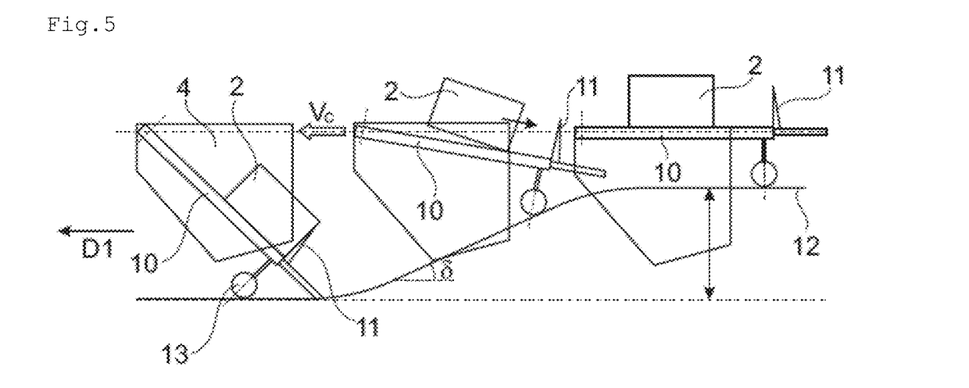
FIG. 5 is a diagrammatic view of a pivoting process whereby a floor of a bin of the invention is caused to pivot from the high position to the low position.

Advantageously, the sorting conveyor 3 further comprises a shaped-profile guide rail 12, which can be seen in FIGS. 4 and 5, and which is designed to cause the floor 10 to pivot between the high position and the low position.

In this example, the guide rail 12 extends in the conveying direction D1 so that the floor 10 co-operates with the guide rail 12 throughout the movement of the bin 4 in the conveying direction D1.

Figure 3D:
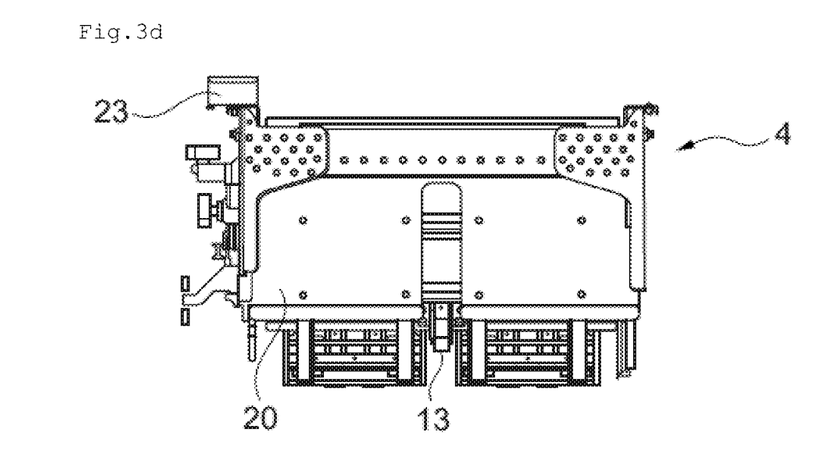
FIG. 3d shows a bin of the invention seen from a certain angle.

For example, the floor 10 is provided with a wheel 13, which can be seen in FIGS. 3c and 3d, and which is designed to slide along the rail 12 while following the height profile thereof.

In order to remove the parcel 2 into a determined sorting outlet 7, the flap 11 pivots from the raised position to a lowered position in which the flap 11 is retracted under the floor 10 as tilted so as to remove the parcel 2 by gravity into a sorting outlet 7, as shown in FIGS. 7a to 7d.

Thus, in order to make the parcel 2 fall as vertically as possible, the flap 11 may be pivoted into the lowered position in order to extend the floor in its plane upstream relative to the conveying direction.

Indeed, extending the floor in its plane makes it possible to accelerate the parcel 2 in the direction opposite from the conveying direction D1 just before it falls.

In place of the flap for accelerating the fall of the parcel 2 into the sorting outlet, the bin 4 further comprises a stationary removal ramp 14.

The removal ramp 14, which can be seen in FIGS. 3a and 3e, is in the form of fork tines and extends the floor 10 in its plane upstream relative to the conveying direction D1.

In which case, the flap 11 is also formed of fork tines, as shown in FIGS. 3a and 3c, so as to pass between the fork tines of the removal ramp 14 while the flap 11 is moving from the raised position to the lowered position.

It is also necessary for the flap 11 to pivot fast enough not to hinder or slow down the descent of the parcel 2 (e.g. in less than 100 milliseconds (ms)), and this is achieved, in this example, by means of a spring 15.

It is also possible to provide a corrugated floor surface 10 so as to limit the friction with the parcel 2 and so as to increase the velocity of the parcel 2 before it falls.

When the flap 11 is opened, the parcel 2 tipping into free fall takes place when the center of gravity of the parcel reaches a point vertically in register with the tips of the fork tines of the removal ramp 14.

Figure 10:
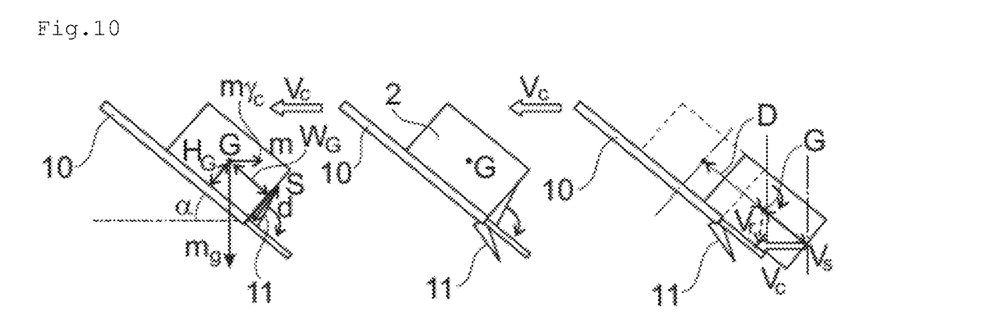
FIG. 10 is a highly diagrammatic view showing the parcel removal principle whereby a parcel is removed over an almost vertical trajectory.

FIG. 10 shows the parcel removal principle whereby a parcel 2 is removed over an almost vertical trajectory.

If $\gamma$ is the acceleration of the parcel 2 and D is the initial distance between the center of gravity and the tips of the fork tines of the removal ramp 14, the ejection velocity $V_e$ at which the parcel 2 is ejected as it starts tipping into free fall is: $V_e = \sqrt{[2\gamma D]}$ The horizontal component of the velocity of the center of gravity G at the start of falling is then: $V_h = V_c - V_e \cos \alpha = V_c - \cos \alpha \sqrt{[\sin \alpha - f \cos \alpha]} \sqrt{[19.6D]}$
where $\underline{f}$ designates the coefficient of friction of the parcel 2 on the floor 10 as tilted.

If $V_h$ is close to 0, the velocity $V_r$ at the start of falling of the parcel 2, is almost vertical.

The optimum angle $\alpha_{opt}$ is deduced from this and varies in the range 38° to 51° when $\underline{f}$ varies in the range 0.1 to 0.5.

For f=0.3 (mean coefficient of friction of the parcels): $\alpha_{opt} \approx 45°$.

The greater the length D, the higher the velocity $V_e$.

D depends on the position of the center of gravity of the parcel 2 ($H_G$ and $W_G$) and on the length of the fork tines of the removal ramp 14.

With small parcels 2, D is not very different from the length of the tines, hence the importance of providing ramp tines 14 that are sufficiently long in such a situation (e.g. at least 180 millimeters (mm)).

But, during the transport, there is a risk that the parcel 2 might tip over the top S of the flap, in particular if the center of gravity G is placed off center to a large extent towards the front and top of the parcel 2.

If $H_G$ and $W_G$ respectively designate the height of the center of gravity of the parcel 2 relative to its base and its distance relative to the flap of height $\underline{d}$, the equilibrium condition is: $H_G - W_G (1/\tan \alpha - \gamma c/g) < d$ For a tilt angle $\alpha$ close to 45°, and a starting acceleration $\gamma c$ less than 0.5 meters per second squared (m/s²), the risk is minimal with a flap 11 in the raised position and having a height of at least 150 mm.

Figure 9:
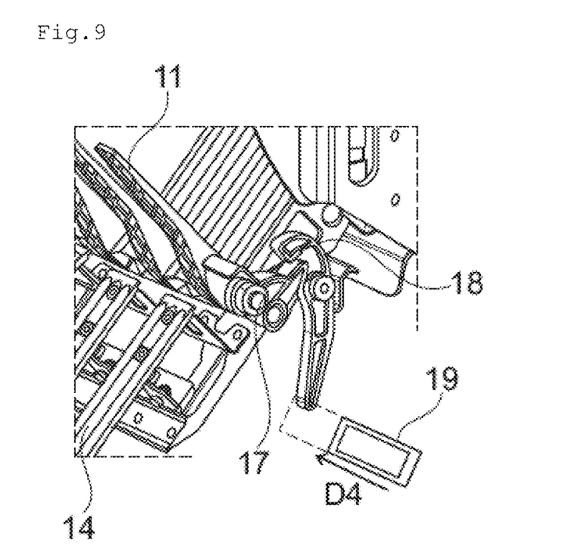
FIG. 9 is an enlarged view of the mechanism for locking and for opening the flap of the invention.
Figure 11:
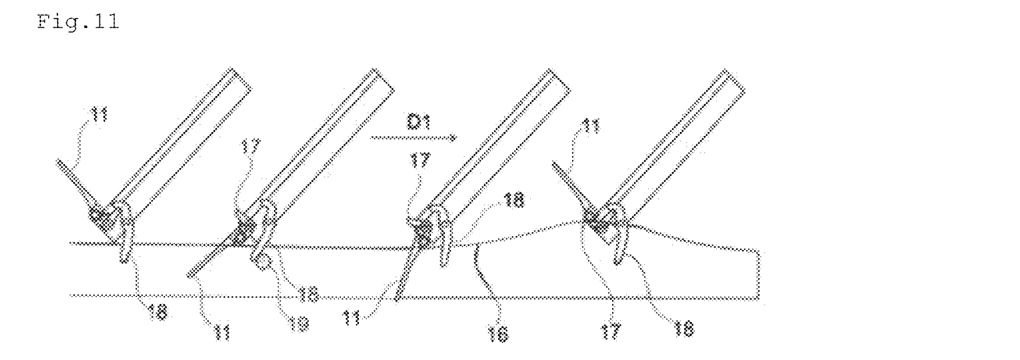
FIG. 11 is a highly diagrammatic view showing a pivoting process whereby the flap of a bin of the invention is caused to pivot between the raised position and the lowered position.

The sorting installation 1 is also equipped with a raising mechanism, shown in FIGS. 9 and 11, designed to bring the flap 11 into the raised position.

In this example, the raising mechanism comprises a shaped-profile raising rail 16 that extends in the conveying direction D1 and that co-operates with a lever 17 secured to the flap 11 while the bin 4 is moving in the conveying direction D1.

The flap 11 pivoting from the lowered position to the raised position thus, in this example, depends on the profile of the raising rail 16.

It is also possible to provide a pawl-type latch 18 on each bin 4 in order to hold the flap 11 in the raised position.

In which case, a mechanical actuator 19 (e.g. operating with an electromagnet) is provided so as to cause the latch 18 to toggle, thereby enabling the flap 11 to pivot into the lowered position.

In this example, the actuator is moved in a direction D4 extending transversely to the conveying direction D1, as can be seen in FIG. 9.

In this example, moving the mechanical actuator 19 in direction D4 is controlled by the monitoring and control unit 8 in response to sorting information about sorting of a parcel 2 that is to be removed into a sorting outlet 7 situated vertically in register with the bin 4.

Each bin 4 may further comprise a tilted downstream deflector 20, which can be seen in FIGS. 3b and 3d and 7a to 7d, extending under the floor 10 and between the two side walls 9.

This deflector 20 is arranged in such a manner as to co-operate with the floor 10 and with the side walls of the adjacent bin 4 downstream in the conveying direction D1 to form a parcel removal chute for removing a parcel 2, as can be seen in FIGS. 7a to 7d.

The deflector 20 makes it possible, in particular, to avoid a parcel 2 falling into an inappropriate sorting outlet 7 by preventing the parcel 2 from tipping over the top of the flap 11 when said flap is in the raised position.

In advantageous manner, the top end of one of the side walls 9 of each bin 4 is provided with a parcel injection guide 21, which can be seen in FIGS. 3a to 3d, and which is formed of a plate 22 flanked by two side deflectors 23 that converge towards the floor 10.

In this example, the injection guide 21 is arranged to come flush with the injector 5 and with the floor 10 in the high position.

The steps of sorting parcels 2 using the sorting installation 1 of the invention are described below.

The parcels 2 are loaded in bulk, i.e. loose, into the feed inlet 6 that inserts the parcels 2 in series onto the injector 5, as shown in FIG. 1.

The parcels 2 are then conveyed in series in the carrying direction D2 in parallel with the sorting conveyor 3 and are then injected one-by-one onto respective floors 10 in the high position.

As shown in FIG. 4, the parcel 2 is guided by the side deflectors 23 of the guide device 21 while it is being injected onto the floor 10.

The floor 10 as loaded with the parcel 2 is then pivoted directly into the low position, as shown in FIG. 5 in such a manner as to cause the parcel 2 to slide towards the flap 11 in the raised position.

The parcel 2 is then conveyed to above the sorting outlet 7 chosen by the monitoring and control unit 8.

The monitoring and control unit 8 then controls the mechanical actuator 19, which releases the flap 11 from being retained by the latch 18.

The flap 11 then tips into the lowered position to release the parcel 2 into the sorting outlet 7.

The flap 11 and the floor 10 are then pivoted respectively into the raised position and into the high position.

The bin 4 then goes around the carousel to come back flush with the injector 5 and to be loaded with a parcel 2 again.

The invention claimed is:

1. A parcel or packet sorting installation for sorting parcels or packets, the installation comprising:
   a bin sorting conveyor having bins that are configured to convey the parcels in series in a certain conveying direction over a plurality of sorting outlets, and a parcel injector configured to inject one parcel per bin,
   said bin sorting conveyor being configured to sort the parcels into the sorting outlets from the bins as a function of sorting information affixed to each of the parcels, each bin comprising two side walls and a floor mounted to pivot between the two side walls, said floor being configured to pivot between a high position and a low position,
   wherein, when the floor is in the low position, the floor is tilted downwards in the direction opposite from the conveying direction, and, when the floor is in the high position, the floor is raised to the horizontal to come flush with an injector conveyor and to come flush with top ends of the side walls, and in that each bin further comprises a flap mounted to pivot at an upstream end of the floor relative to the conveying direction, said flap being configured to pivot between a blocking position, in which the flap is raised to retain a parcel on the floor while said parcel is moving in the conveying direction, and a lowered position, in which the flap is retracted to enable a parcel to be removed by gravity into a sorting outlet.

2. The sorting installation according to claim 1, wherein, in the lowered position, the flap extends the floor in its plane upstream relative to the conveying direction.

3. The sorting installation according to claim 1, wherein each bin further comprises a removal ramp in the form of fork tines that extend the floor in its plane upstream relative to the conveying direction, and in that the flap is also in the form of fork tines that are arranged to pass between the fork tines of the removal ramp while the flap is moving from the raised position to the retracted position.

4. The sorting installation according to claim 1, wherein the flap is pivoted from the raised position to the lowered position by means of a spring.

5. The sorting installation according to claim 1, wherein the sorting conveyor further comprises a shaped-profile raising rail that extends in the conveying direction, and in that each bin further comprises a lever that is secured to the flap and that is configured to co-operate with the raising rail while the bin is moving in the conveying direction so that the flap pivots from the lowered position to the raised position as a function of the raising profile of the rail.

6. The sorting installation according to claim 1, wherein each bin further comprises a latch suitable for holding the flap in the raised position, and in that the sorting conveyor further comprises a mechanical actuator suitable for being actuated under the control of a monitoring and control unit n response to sorting information affixed to the parcel to be sorted into a sorting outlet so as to cause the latch to toggle and to allow the flap to pivot into the lowered position above said sorting outlet.

7. The sorting installation according to claim 1, wherein the sorting conveyor further comprises a shaped-profile guide rail that extends in the conveying direction, said floor co-operating with the guide rail while the bin is moving in the conveying direction to pivot between the high position and the low position as a function of the guide profile of the rail.

8. The sorting installation according to claim 1, wherein the floor has a corrugated surface.

9. The sorting installation according to claim 1, wherein the tilt angle at which the floor tilts in the low position is defined as a function of a mean coefficient of friction of the parcels to be sorted.

10. The sorting installation according to claim 1, wherein each bin further comprises a tilted downstream deflector that extends under the floor and between the two side walls, said deflector co-operating with the floor and with the side walls of an adjacent bin downstream in the conveying direction to form a parcel removal chute.

11. The sorting installation according to claim 1, wherein each bin further comprises a parcel injection guide comprising a plate flanked by two side deflectors converging towards the floor, said injection guide being disposed on one of the side walls so as to come flush with the injector and with the floor in the high position.

* * * * *